Figure 1:
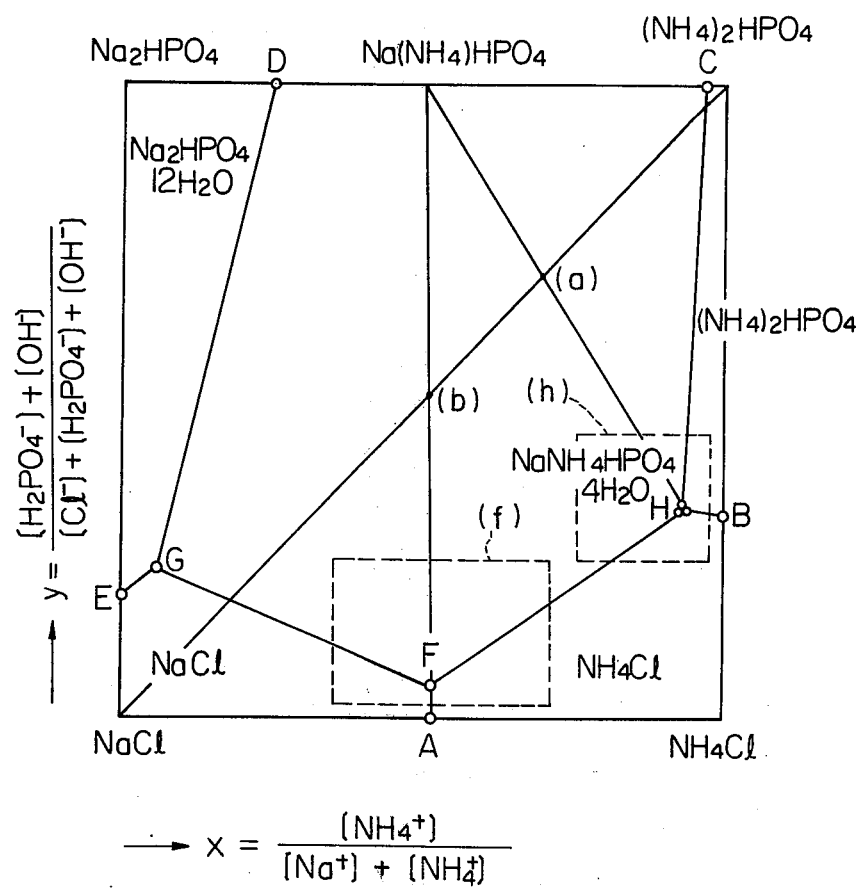

United States Patent [19]

Fujita et al.

[11] 4,117,089

[45] Sep. 26, 1978

[54] PROCESS FOR PREPARING SODIUM AMMONIUM HYDROGEN-PHOSPHATE AND AMMONIUM CHLORIDE FROM WET PROCESS PHOSPHORIC ACID

[75] Inventors: Yoshishige Fujita; Soichi Asagao; Motoshige Ogura, all of Ube, Japan

[73] Assignee: Central Glass Company, Limited, Japan

[21] Appl. No.: 823,168

[22] Filed: Aug. 9, 1977

[30] Foreign Application Priority Data

Aug. 10, 1976 [JP] Japan .................................. 51-94499

[51] Int. Cl.$^2$ ...................... C01B 15/16; C01B 25/26; C01C 1/16
[52] U.S. Cl. .................................. 423/306; 423/310; 423/470
[58] Field of Search ................ 423/306, 305, 307–313, 423/470, 471

[56] References Cited

U.S. PATENT DOCUMENTS 3,531,242  9/1970  Hayakawa et al. ................... 423/306
3,619,133  10/1971  Fukuba et al. ........................ 423/310

FOREIGN PATENT DOCUMENTS 1,179,456  1/1970  United Kingdom .................... 423/310

Primary Examiner—O. R. Vertiz
Assistant Examiner—Gregory A. Heller
Attorney, Agent, or Firm—Lowe, King, Price & Becker

[57] ABSTRACT

Highly pure sodium ammonium hydrogenphosphate and ammonium chloride are prepared from wet process phosphoric acid. A mixture of phosphoric acid, ammonia and/or sodium chloride is added to a circulating mother liquor, to which is additionally added ammonia until the pH of the liquor reaches 5.5 to 9.0. The liquor is then cooled to cause sodium ammonium hydrogenphosphate to crystallize at 30° to 60° C. The resulting filtrate is added with an acidic compound to adjust its pH to 5.6 to 6.4 whereby the solubility of the hydrogenphosphate is increased while that of ammonium chloride is reduced to a minimum. The filtrate is cooled to 5° to 50° C to precipitate ammonium chloride as crystals without involving co-precipitation of the hydrogenphosphate. The filtrate from which the ammonium chloride crystals have been removed is recycled for use as a circulating mother liquor.

12 Claims, 4 Drawing Figures

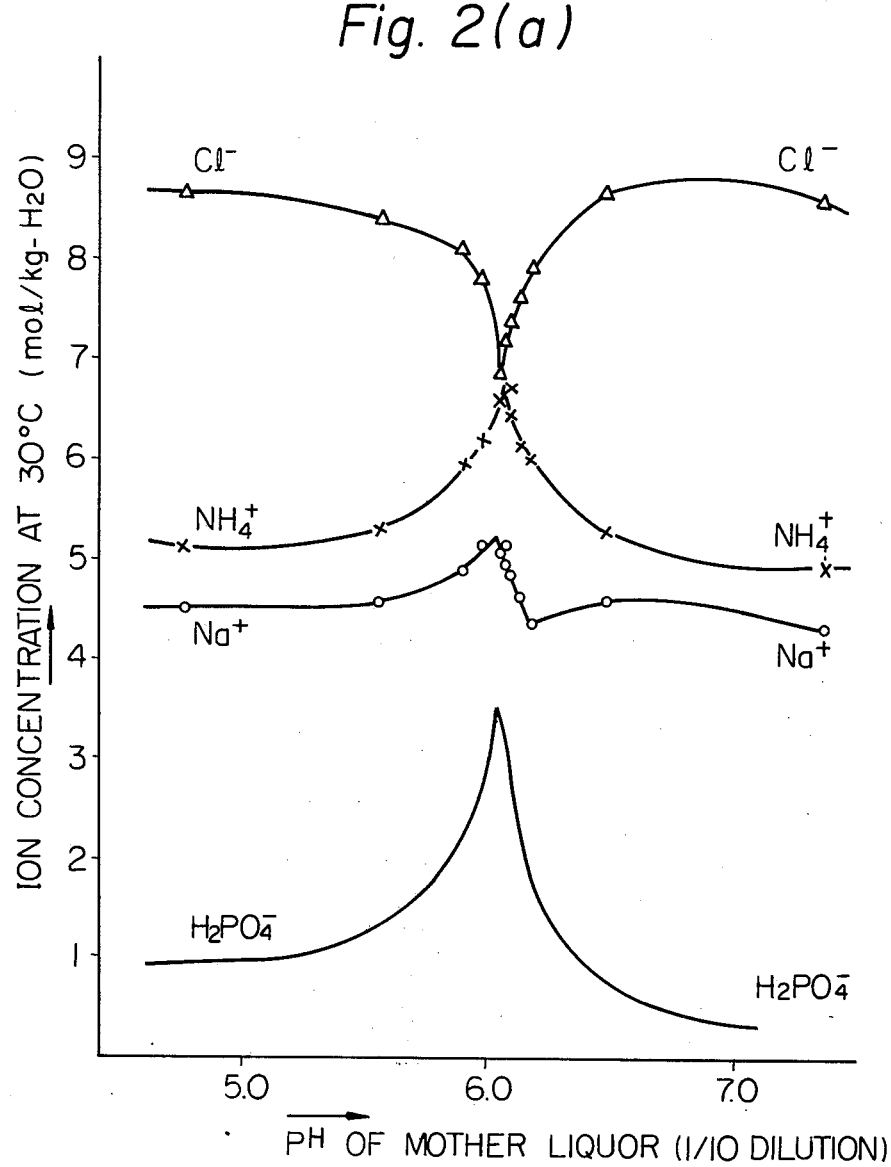

PROCESS FOR PREPARING SODIUM AMMONIUM HYDROGEN-PHOSPHATE AND AMMONIUM CHLORIDE FROM WET PROCESS PHOSPHORIC ACID

This invention relates to the treatment of wet process phosphoric acid and more particularly, to a process for producing sodium ammonium hydrogenphosphate and ammonium chloride both of high purity from wet process phosphoric acid by a continuous manner. The sodium ammonium hydrogenphosphate, $NaNH_4HPO_4 \cdot 4H_2O$ sometimes called microcosmic salt or phosphor salt and will be hereinlater referred to as such for the sake of brevity.

As well known in the art, production of phosphor salt from wet process phosphoric acid, ammonia, and sodium chloride is feasible by processes using reactions expressed by the following formulae

(1)

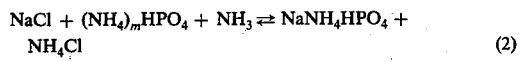

(2)

In the industrial production of the phosphor salt, a wet process phosphoric acid solution which contains a variety of impurities derived from starting ore of phosphorus is first added with ammonium to form ammonium phosphate together with a precipitate of the impurities. The precipitated impurities are separated by filtration from the solution to obtain an ammonium phosphate solution. To the solution are added sodium chloride and, if necessary, ammonia in additional amount according to the formula (2) to permit the phosphor salt to separate as crystals. When the wet process phosphoric acid, ammonia and sodium chloride are mixed in different molar ratios, the mother liquors obtained after separation of the phosphor salt crystals have different compositions such as of a mixture of phosphor salt, diammonium hydrogen-phosphate and ammonium chloride, and of a mixture of phosphor salt, ammonium chloride and sodium chloride, as will be described in detail hereinlater.

These mother liquors from which the crystals of phosphor salt have been removed may be used or applied as follows:

(1) The mother liquor which contains diammonium hydrogenphosphate and ammonium chloride as major components is usable as a starting materials for producing fertilizers;

(2) With the mother liquor containing phosphor salt, ammonium chloride and sodium chloride, it is cooled to a temperature as low as possible at an eutectic point of phosphor salt, sodium chloride and ammonium chloride where the concentration of $PO_4$ is reduced to a minimum, thereby causing the phosphor salt to precipitate as much as possible, and after removal of the precipitate, the resulting filtrate is utilized as a mother liquor for producing ammonium chloride and soda ash by a soda-ammonium chloride process; and (3) After separation of the phosphor salt crystals, the mother liquor is cooled with or without addition of sodium chloride to cause ammonium chloride to precipitate and the resulting filtrate is recycled for mixing with a fresh phosphoric acid solution. However, the above applications involve drawbacks, respectively. That is, the application of the mother liquor as fertilizer is disadvantageous in that the fertilizer derived from such liquor irresistibly contains an undesirable sodium component and that the fertilizer is limited in composition when using such liquor as starting material. In the application (2), phosphoric acid which is contained in the mother liquor is inevitably introduced into the reaction system of the soda-ammonium chloride production process when the liquor is used as it is. Hence, the phosphoric acid must be removed by means of, for example, milk of lime, requiring a complicate and additional procedure. Besides, the resulting calcium phosphate has not any industrial merit and is thus rather troublesome. The last process (3) is considered advantageous from an industrial point of view since phosphoric acid and sodium chloride are utilized efficiently, but has not been realized yet. This is because when the mother liquor obtained after separation of the phosphor salt crystals is cooled with or without addition of sodium chloride to permit ammonium chloride to precipitate, small amount of sodium chloride is inevitably co-precipitated with ammonium chloride, lowering the purity of the ammonium chloride.

In order to cope with the above difficulty, there has been proposed a process such as disclosed in U.S. Pat. No. 3,619,133. In the process, wet process phosphoric acid is neutralized with ammonia and added with sodium chloride at a mol ratio of $H_3PO_4:NH_3:NaCl$ of 1:1.5–2.7:0.8–2.5, followed by cooling to precipitate phosphor salt. The mother liquor after separation of the phosphor salt crystals is then concentrated to form ammonium chloride crystals at a temperature higher than the temperature at which phosphor salt crystallizes. That is, the ammonium chloride crystals are formed within a temperature range in which co-precipitation of phosphor salt does not take place. However, the process is disadvantageous in that a great amount of heat energy is required to concentrate the mother liquor after the separation of the phosphor salt crystals and hence the expense of installation for the concentration or evaporation will pile up.

It is therefore an object of the present invention to provide a process for producing sodium ammonium hydrogenphosphate and ammonium chloride both in high purities from wet process phosphoric acid, which overcomes the prior disadvantage.

It is another object of the present invention to provide a process for producing sodium ammonium hydrogenphosphate and ammonium chloride by a continuous manner in which the mother liquor after separation of the ammonium chloride is recycled for mixing with a fresh wet process phosphoric acid solution.

It is a further object of the present invention to provide a process for producing highly pure sodium ammonium hydrogenphosphate and ammonium chloride wherein starting wet process phosphoric acid and sodium chloride are utilized at high efficiencies of nearly 100%.

It is a still further object of the present invention to provide a process for producing highly pure sodium ammonium hydrogenphosphate and ammonium chloride wherein crystallizations of the hydrogenphosphate and ammonium chloride are conducted under selected pH conditions, respectively.

Figure 2B:
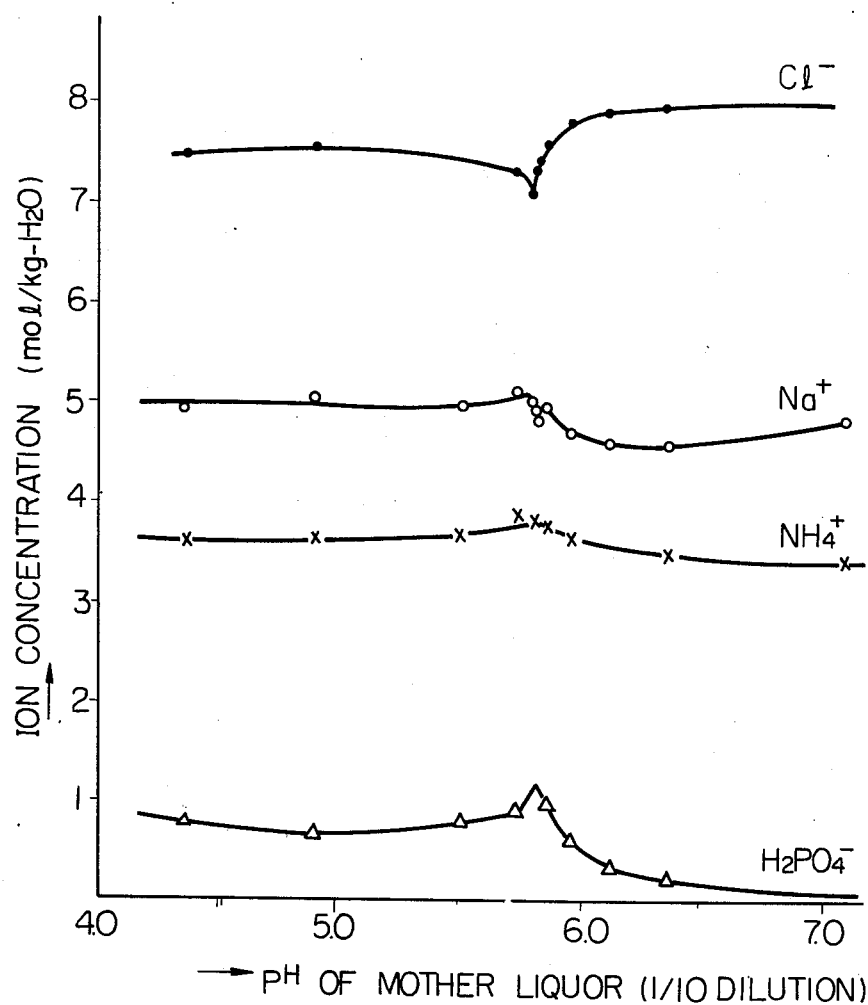
Figure 3:
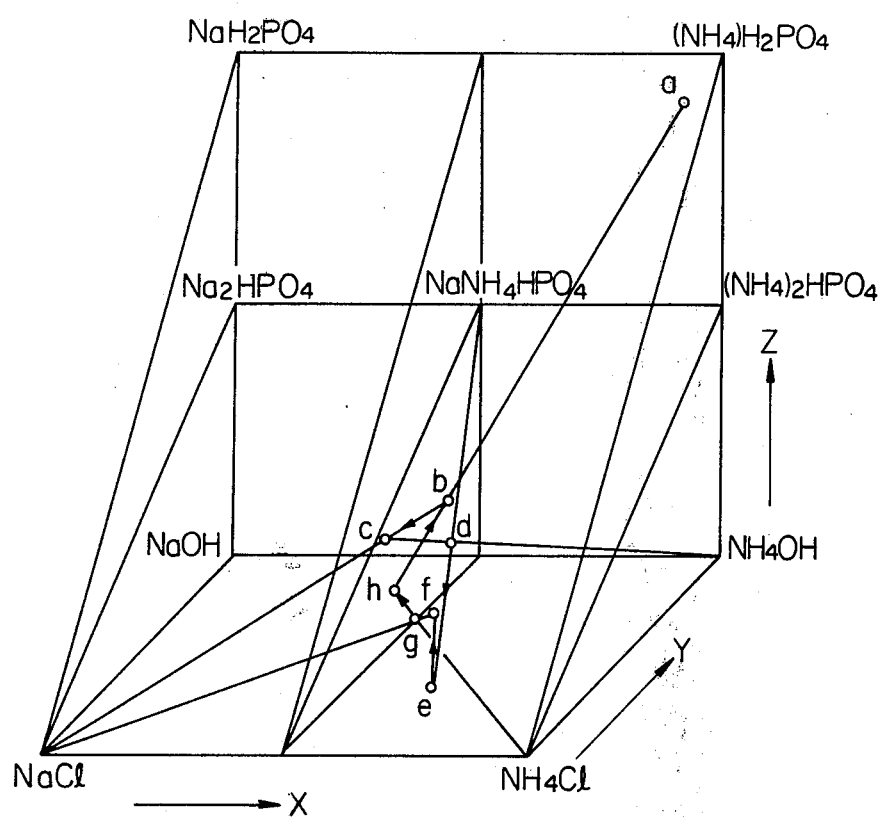

The above objects can be achieved by a process according to the invention which comprises the steps of (a) introducing ammonia into a wet process phosphoric acid solution until the pH of the solution ranges from 3.5 to 6.0 to cause precipitation of impurities contained in the solution, the solution being maintained at a temperature above 60° C. upon completion of the introduction of ammonia; (b) separating at least a portion of the precipitated impurities from the solution, the resulting solution having a molar ratio of $NH_3/H_3PO_4$ of from 0.7 to 1.5; (c) adding the solution from which the impurities have been separated, to a circulating mother liquor maintained at temperatures within which sodium ammonium hydrogenphosphate is hard to precipitate; (d) introducing sodium chloride into the solution in step (a) or into the mother liquor in step (c); (e) additionally introducing ammonia into the liquor until the pH of the liquor ranges from 5.5 to 9.0, the total amounts of ammonia introduced in steps (a) and (e) of sodium chloride introduced in step (d) being such that the molar ratios of $H_3PH_4:NH_3:NaCl$ of 1:1.6–2.5:0.2–2.8; (f) cooling the liquor to a temperature of 30° C. to 60° C. to permit trating the preparation of phosphor salt according to one aspect of the invention;

FIGS. 2(a) and 2(b) are graphical representations of ion concentrations of reciprocal salt pairs of a Na-Cl—$NH_4Cl$—$(NH_4)_2HPO_4$—$NH_4H_2PO_4$—$H_2O$ system in relation to variation in pH value of the mother liquor at 30° C. and 10° C., respectively; and FIG. 3 is an operation diagram of a recycling process according to the invention.

Referring now to FIG. 1, there is shown a phase diagram of a $Na^+$—$NH_4^+$—$Cl^-$—$HPO_4^{2-}$—$H_2O$ equilibrium system which is obtained by an equilibrium test at 25° C. wherein the system is so controlled as to have liquid compositions and solid phases corresponding to points A through H shown in the figure. The liquid compositions and solid phases corresponding to the points A through H are summarized in Table 1 below Table 1

| | Charged composition for equilibrium test (g) | | | | | | Test results | | | | | | |
|---|---|---|---|---|---|---|---|---|---|---|---|---|---|
| | | | | | | | ion concentrations (g . ion/kg . $H_2O$) | | | | | | precipitate |
| | NaCl | $NH_4Cl$ | $(NH_4)_2HPO_4$ | $Na_2HPO_4$ $12H_2O$ | $Na(NH_4)HPO_4$ . $4H_2O$ | $H_2O$ | $Na^+$ | $NH_4^+$ | $Cl^-$ | $HPO_4^{2-}$ | $x^*$ | $y^*$ | solid phase** |
| A | 65 | 65 | | | | 200 | 4.37 | 4.49 | 8.86 | 0 | 0.51 | 0 | a, b |
| B | | 85 | 55 | | | 200 | 0 | 9.83 | 6.71 | 1.56 | 1.00 | 0.32 | b, c |
| C | | | 170 | | 15 | 200 | 0.32 | 10.56 | 0 | 5.44 | 0.97 | 1.00 | c, e |
| D | | | | 100 | 30 | 150 | 1.87 | 0.63 | 0 | 1.25 | 0.25 | 1.00 | e, d |
| E | 80 | | | 75 | | 180 | 6.66 | 0 | 5.40 | 0.63 | 0 | 0.19 | d, a |
| F | 65 | 65 | | | 15 | 200 | 4.40 | 4.66 | 8.60 | 0.23 | 0.51 | 0.05 | a, b, c |
| G | 90 | | | 100 | 30 | 200 | 6.87 | 0.48 | 5.67 | 0.84 | 0.06 | 0.23 | a, d, e |
| $H_1$ | | 85 | 55 | | 25 | 200 | 0.55 | 9.52 | 6.81 | 1.63 | 0.94 | 0.32 | b, c |
| $H_2$ | | 85 | 50 | | 30 | 200 | 0.72 | 9.57 | 6.82 | 1.74 | 0.93 | 0.34 | b, c |
| $H_3$ | 100 | 75 | 75 | | | 200 | 0.78 | 9.65 | 6.91 | 1.76 | 0.92 | 0.34 | b, c, e |
| $H_4$ | | 85 | 40 | | 50 | 190 | 0.78 | 9.62 | 6.84 | 1.78 | 0.92 | 0.34 | b, c, e |
| $H_5$ | 15 | 75 | 80 | | | 210 | 0.79 | 9.62 | 6.85 | 1.78 | 0.92 | 0.34 | b, c, e |

Note:

$$*x = \frac{[NH_4^+]}{[NH_4^+] + [Na^+]}$$

$$*y = \frac{[H_2PO_4^-] + [OH^-]}{[Cl^-] + [H_2PO_4^-] + [OH^-]}$$

**a:NaCl,
b:$NH_4Cl$,
c: $(NH_4)_2HPO_4$,
d:$Na_2HPO_4$ . $12H_2O$,
e:$Na(NH_4)HPO_4$ . $4H_2O$ sodium ammonium hydrogenphosphate to separate as crystals; (g) removing the crystals from the liquor; (h) adding to the resulting liquor an acidic compound such as phosphoric acid, acidic ammonium phosphate, hydrochloric acid, sulfuric acid, nitric acid or a mixture thereof until the pH of the liquor reaches from 5.6 to 6.4; (i) cooling the added liquor to a temperature lower than the temperature of the step (f) and ranging from 5° to 50° C. to precipitate ammonium chloride as crystals; (j) removing the ammonium chloride crystals from the liquor; and (k) recycling the resulting solution for use as a circulating mother liquor. The present invention is based on a finding that when the mother liquor is adjusted, upon the precipitation of ammonium chloride, to within a certain range of pH, i.e., 5.6–6.4, the solubility of ammonium chloride is reduced to a minimum with an increased solubility of the phosphor salt. By cooling the adjusted liquor, ammonium chloride can be precipitated without an attendant co-precipitation of the phosphor salt.

The foregoing and other objects, features and advantages of the invention will be apparent from the following descriptions with reference to the accompanying drawings, in which:

FIG. 1 is a phase diagram of a $Na^+$—$NH_4^+$—$Cl^-$—$HPO_4^{2-}$—$H_2O$ equilibrium system suitable for illus- Preparation of the phosphor salt alone from wet process phosphoric acid, sodium chloride and ammonia has been already proposed in our co-pending Japanese Patent Application No. 148915/1974 (corresponding to United State Patent Application Ser. 637,535 now abaondoned). The crystallization of the phosphor salt using a circulating mother liquor will be first described with reference to the above Table and FIG. 1.

First of all, a wet process phosphoric acid solution is added with ammonia for reaction at temperatures of from 60° C. to 110° C. until the pH of the solution becomes between 3.5 and 6.0. Upon the addition, impurities contained in the phosphoric acid solution are separate as precipitate. The kind of the precipitate formed by the addition of ammonia will vary depending on the pH of the solution. In a pH range of below 4, impurities such as iron, aluminum silicic acid, fluorine and the like are combined with phosphoric acid or ammonia to form compounds of complicate structures, particularly aluminum phosphate in the form of a gel. The gel is generally very viscous and is thus difficult to completely separate from the solution.

To avoid this, sodium chloride should preferably be present in the neutralization system. In doing so, a formed precipitate is ready to settle with a clear solution being left. Presumably, this is because sodium component serves to form sodium aluminum fluoride or sodium iron fluoride which is ready to settle. However, sodium chloride which is present in the neutralization system also serves to lower the solubility of ammonium dihydrogenphosphate in water. In the case, the neutralization temperature should preferably be high enough to avoid the deposition or precipitation of the ammonium dehydrogenphosphate together with the impurities.

In the practice of the invention, the crystallization of the phosphor salt is preferred to be carried out in equilibrium phases corresponding to point F or its neighbouring area bounded by a square of dash line (f), or to point H or its neighbouring area bounded by a square of dash line (h), of FIG. 1. The reaction is conducted at a temperature of from 60° C. to a boiling point of the reaction system, preferably above 80° C. to the boiling point, in a pH range of from 3.5 to 6.0, ferably from 3.6 to 4.6.

Upon the neutralization of the phosphoric acid with ammonia, the resulting liquid composition generally varies depending on the $NH_3/H_3PO_4$ ratio by mole or the pH thereof as follows: Ammonium dihydrogenphosphate, $(NH_4)H_2PO_4$ is predominantly produced in an $NH_3/H_3PO_4$ molar ratio ranging from about 0.7 to 1.5, i.e., in a pH range of from 3.3 to 5.5; and diammonium hydrogenphosphate is formed in large proportion in an $NH_3/H_3PO_4$ molar ratio ranging from 1.53 to 1.62, i.e., in a pH range of from 5.8 to 6.8. Accordingly, the neutralization according to the invention will result in a liquid composition having a major proportion of ammonium dihydrogenphosphate and a minor proportion of diammonium hydrogenphosphate.

Then, the precipitated impurities are removed from the solution by any of known methods such as filtration, centrifugal separation, etc. The solution after the removal of the impurities may contain fine particles of the impurities since such particles are not favorable but do not give any significant influence on subsequent operations. In this stage, the solution should have a molar ratio of $NH_3/H_3PO_4$ of 0.7–1.5:1, preferably 0.8–1.2:1.

The solution is then added to a circulating mother liquor while maintaining the temperature above 60° C. so as to avoid unnecessary precipitation of the phosphor salt. To the liquor is further added ammonia until the pH of the liquor ranges from 5.5 to 9.0. In the stage, sodium chloride may be added to the liquor instead of adding in the neutralization step if sodium chloride is relatively pure as obtained by washing it with brine or the like.

In a preferred embodiment of the invention, the liquor which has been added with the phosphor acid, ammonia and sodium chloride should have molar ratios of $H_3PO_4:NH_3:NaCl$ of 1:1.6–2.5:0.2–2.8 and a pH value of from 6.2 to 9.0 and most preferably 6.7 to 8.5. This will be described in more detail. When the precipitation of phosphor salt is conducted in an equilibrium phase corresponding to point H or its neighbouring area, the added liquor should have molar ratios of $H_3PO_4:NH_3:NaCl$ of 1:1.6–2.5:0.7–1.2, preferably 1:1.9–2.3:0.8–1.05 and a pH value of from 6.2 to 9.0, preferably from 7.1 to 8.5. While, when the equilibrium phase corresponding to point F or its neighbouring area of FIG. 1 is used, the liquor added with the three components should have molar ratio of $H_3PO_4:NH_3:NaCl$ of 1:1.6–2.5:1.3–2.8, preferably 1:1.9–2.3:1.4–2.6, and a pH of from 6.2 to 8.0, preferably 6.7 to 7.6. As a matter of course, the equilibrium phases other than those corresponding to the above-mentioned points or areas may be also used for the preparation of the phosphor salt.

The liquor is then cooled to a temperature of from 30° to 60° C., preferably 40° to 50° C. to permit sodium ammonium hydrogenphosphate, i.e., phosphor salt, to separate as crystals. If it is intended to precipitate the phosphor salt as much as possible, the liquor is preferred to be cooled to a temperature as low as possible. Since, however, the liquor is recycled without being discharged from the system, too much cooling is rather undesirable from a viewpoint of energy consumption. The crystals may be removed from the liquor by any known methods such as ordinarily employed vacuum or centrifugal filtration.

The following steps of treating the liquor from which the crystals have been removed are most important in the practice of the invention. As described hereinbefore, it has been found that when the liquor is adjusted to a certain pH range, the solubility of ammonium chloride is reduced to a minimum while increasing the solubility of phosphor salt which is still contained in the liquor. This will be particularly illustrated with reference to FIG. 2(a), in which there are shown ion concentrations, at 30° C., of a mother liquor from which phosphor salt has been removed, in relation to variation in pH of the liquor. These data are summarized in Table 2 below.

Table 2

| Relation Between Ion Equilibrium Concentration And pH Variation | | | | | | | | | | | |
|---|---|---|---|---|---|---|---|---|---|---|---|
| pH of mother liquor diluted with ten times water at 20° C | 4.75 | 5,56 | 5,90 | 5.98 | 6.07 | 6.07 | 6.07 | 6.08 | 6.11 | 6.19 | 6.49 | 7.41 |
| (mol/kg.$H_2O$) | | | | | | | | | | | | |
| $Na^+$ | 4.50 | 4.54 | 4.87 | 5.11 | 4.69 | 4.71 | 4.86 | 4.52 | 4.23 | 3.58 | 4.54 | 4.26 |
| $NH_4^+$ | 5.14 | 5.26 | 5.94 | 6.18 | 7.29 | 6.92 | 6.88 | 7.29 | 7.53 | 7.14 | 5.26 | 4.89 |
| $H_2PO_4^-$ | 0.96 | 1.31 | 2.18 | 2.60 | 3.74 | 3.70 | 3.70 | 3.83 | 3.59 | 2.51 | 0.74 | 0.30 |
| $Cl^-$ | 8.65 | 8.36 | 8.06 | 7.76 | 7.33 | 7.03 | 7.17 | 7.38 | 7.34 | 7.56 | 8.62 | 8.55 |
| $OH^-$ | 0.03 | 0.13 | 0.57 | 0.93 | 0.91 | 0.90 | 0.87 | 0.60 | 0.83 | 0.65 | 1.59 | 0.30 |
| X* | 0.53 | 0.54 | 0.55 | 0.55 | 0.61 | 0.60 | 0.59 | 0.62 | 0.64 | 0.67 | 0.54 | 0.53 |
| Y | 0.10 | 0.15 | 0.25 | 0.31 | 0.39 | 0.40 | 0.39 | 0.38 | 0.38 | 0.29 | 0.21 | 0.07 |
| Z | 0.10 | 0.13 | 0.20 | 0.23 | 0.31 | 0.32 | 0.32 | 0.32 | 0.31 | 0.23 | 0.07 | 0.03 |
| | f** | f | f | f | f | f | f | f | f | f | f | f |
| Precipitated solid phase | g | g | g | g | h | h | h | h | i | g | g | g |

Table 2-continued
Relation Between Ion Equilibrium Concentration And pH Variation

| pH of mother liquor diluted with ten times water at 20° C | 4.75 | 5.56 | 5.90 | 5.98 | 6.07 | 6.07 | 6.07 | 6.08 | 6.11 | 6.19 | 6.49 | 7.41 |
|---|---|---|---|---|---|---|---|---|---|---|---|---|
| | h | h | h | h | i | i | i | i | i | i | i | i |

Note:

$$*X = \frac{NH_4^+}{Na^+ + NH_4^+}$$

$$Y = \frac{H_2PO_4^- + OH^-}{Cl^- \times H_2PO_4^- + OH^-}$$

$$Z = \frac{H_2PO_4^-}{Cl^- + H_2PO^- + OH^-}$$

**f: $NH_4Cl$, g:$NaCl$, h:$NH_4H_2PO_4$, i:$NaNH_4HPO_4 \cdot 4H_2O$

These equilibrium data were obtained as follows. The mother liquor containing the crystals of the phosphor salt was sampled and adjusted with water ten times that of the liquor at 20° C. The diluted liquor had a pH value of 7.41. This liquor was then stepwise varied in pH, as shown in Table 2, by addition of predetermined amounts of phosphoric acid.

As will be clearly seen from the table and the figure, the concentrations of $Cl^-$, $NH_4^+$, $Na^+$, and $H_2PO_4^+$ each abruptly vary in the neighbourhood of a pH value of 6.08. At 30° C. in the vicinity of a pH value of 6.08, the ion concentration of $H_2PO_4^-$ has a maximum while that of $Cl^-$ is reduced to a minimum. With a pH range of greater than 6.08, an eutectic mixture of phosphor salt, ammonium chloride and sodium chloride appears as stable solid phase. In the pH range of lower than 6.08, on the contrary, an eutectic mixture of ammonium dihydrogenphosphate, ammonium chloride and sodium chloride precipitates as solid phase.

In practice, the mother liquor from which the phosphor salt crystals have been removed is added with an acidic compound such as phosphoric acid, acidic ammonium phosphates including ammonium dihydrogenphosphate and diammonium hydrogenphosphate, or mineral acids including sulfuric acid, nitric acid, hydrochloric acid or the like, of which phosphoric acid and acidic ammonium phosphate are preferred, thereby adjusting the pH of the liquor to from 5.6 to 6.4, preferably from 6.1 to 6.4. The thus adjusted liquor is then cooled to a temperature which is lower than the temperature at which the phosphor salt has been crystalized and ranges from 5° to 50° C. As a result, ammonium chloride alone is caused to precipitate without involving co-precipitation of the phosphor salt.

It will be noted here that the pH value at which the solubility of phosphor salt increases to a maximum, more or less varies depending on the temperature of the liquor, e.g., the abrupt changes in the solubility of phosphor salt occur at a pH of 5.83 at 10° C. (see FIG. 2(b)) and at a pH of 5.95 at 20° C., respectively. If the crystallization temperature of ammonium chloride is determined as 10° C. or 20° C., the pH of the liquor should preferably be adjusted to 5.83 or 5.95, respectively.

The precipitate of the ammonium chloride is removed from the liquor similarly to the case of the phosphor salt crystals and the resulting filtrate is recycled for use as a circulating mother liquor.

The recycling process of the invention will be described in more detail with reference to FIG. 3. In the operations shown in the diagram of FIG. 3, the crtstallization of phosphor salt is conducted at equilibrium point F of FIG. 1 where the concentration of phosphoric acid is relatively low. The crystallization temperature is determined as 50° C. since it is advantageous in an industrial sense to operate at such temperature. The mother liquor after separation of the phosphor salt crystals is added with sodium chloride and an acid, and cooled to 30° C. to cause ammonium chloride to precipitate without causing co-precipitation of phosphor salt still remaining in the liquor. The resulting mother liquor is reused as a recycling liquor.

This recycling process will be described in order.

A wet process phosphoric acid solution (which may be a defluorinated phosphoric acid solution obtained by treating the wet process phosphoric acid with an alkali such as sodium carbonate, sodium hydroxide or the like to remove fluorine therefrom) is first added with ammonia until ammonium dihydrogenphosphate, diammonium hydrogenphosphate or a mixture thereof is formed. Upon the neutralization, the impurities such as Fe, Al, Si, F, etc., contained in the phosphoric acid are allowed to precipitate in the form of phosphates or other sparingly soluble compounds. The precipitate is separated from the solution in such a high temperature range that the dihydrogenphosphate or hydrogenphosphate does not appear as crystals. During the course of the neutralization, a great amount of reaction heat generates so that the solution is in a boiling state and will be concentrated to an extent. This is rather favorable from a viewpoint of water balance and it is unnecessary to cool the solution from outside. The precipitate of the impurities is removable by any of known solid-liquid separation methods. As described hereinbefore, a small amount of fine particles of the precipitate may be left in the solution. The resulting ammonium phosphate solution which has a $NH_4^+/PO_4^-$ ratio of 1.2 is shown at point a of FIG. 3. Then, the solution and sodium chloride are introduced into a circulating mother liquor, to which is generally added further ammonia as described hereinbefore. The sodium chloride to be added may be purified or non-purified industrial salt. With the non-purified salt, impurities brought into the reaction system more or less increase in amount, with a slight increase of amount of the mother liquor discharged from the system by entrainment of the increased amount of the removed impurities. The sodium chloride may be added to the mother liquor either after addition to the ammonium phosphate solution or simultaneously with the addition of the solution so far as the mixture is maintained at temperatures at which no phosphor salt appears as crystals. To the liquor is added ammonia to adjust its pH to 5.5 to 9.0. That is, when the ammonium phosphate solution (corresponding to point a) is added to the circulating mother liquor obtained after separation of ammonium chloride and having a composition corresponding to point h, the equilibrium phase of the mother liquor is shifted upwardly of a line connecting the points h and a up to point b as viewed in FIG. 3. The addition of sodium chloride to the liquor having an equilibrium phase corresponding to the point b causes the phase to move on a line connecting the point b and a point indicated by NaCl until it reaches point c. Upon the addition of ammonia, the phase of the liquor reaches point d.

Then, the liquor is cooled to 50° C., the phosphor salt is separated as crystals with a mother liquor having a composition or equilibrium phase corresponding to point e. The crystallization of the phosphor salt is feasible at any temperatures below 60° C. The temperature is generally in the range of 30° C. to 60° C., preferably 40° C. to 50° C. While, the crystallization temperature of ammonium chloride is generally in the range of 5° C. to 50° C., preferably 10° C. to 30° C. The crystallization temperature for ammonium chloride should be selected within the above range lower than a selected crystallization temperature for the phosphor salt. In case where the crystallization temperatures for phosphor salt and ammonium chloride are set as 50° C. and 30° C., respectively, as in the case of this recycling process, the crystallization of phosphor salt is feasible by a cooling method using vacuum evaporation while that of ammonium chloride can be advantageous effected by a condenser using a coolant water such as of river, sea or well.

The mother liquor after separation of the phosphor salt is adjusted in pH as defined hereinbefore and then added with sodium chloride. In order to lower the pH of the liquor, an acidic substance such as phosphoric acid, acidic ammonium phosphate, hydrochloric acid, sulfuric acid, nitric acid or a mixture thereof is added to the liquor. By the pH adjustment, the formulation of the liquor is closely brought into an eutectic point of phosphor salt and ammonium dihydrogenphosphate, as illustrated in relation to FIG. 2(a), with the result that the solubility of the phosphor salt increases with a decreased solubility of ammonium chloride. If sodium chloride is further added to the liquor, the amount of ammonium chloride crystals produced will be increased to a maximum.

The above will be illustrated with reference to FIG. 3. When an acidic substance, e.g., phosphoric acid, is added to the liquor having a composition or equilibrium corresponding to point e, the equilibrium phase is shifted in an upward direction parallel to the axis of Z, as viewed in FIG. 3, from the point e to point f. Addition of sodium chloride to the resulting liquor causes the phase to move along a line connecting the point f and the point NaCl, resulting in a phase corresponding to point g. The liquor in equilibrium at the point g is cooled to allow ammonium chloride to precipitate with a mother liquor having a formulation corresponding to point h on an extension of a line connecting the point (g) and point $NH_4Cl$. Upon reaching the point h, the crystallization of ammonium chloride is complete. The phase point h is very close to an eutectic point for $NaNH_4HPO_4$—$NH_4Cl$—$NaCl$—$NH_4H_2PO_4$ at 30° C. The liquor in phase point h is again added with an ammonium phosphate solution in phase point a to form a mixture which is in equilibrium at point b, followed by taking the steps through the phase points c, d, e, f, g, and h.

The relative $NH_4^+$ concentration expressed by $$\frac{NH_4^+}{Na^+ + NH_4^+},$$

a relative $H_2PO_4^- + OH^-$ concentration expressed by $$\frac{H_2PO_4^- + OH^-}{Cl^- + H_2PO_4^- + OH^-},$$

and a relative $H_2PO_4^-$ concentration expressed by $$\frac{H_2PO_4^-}{Cl^- + H_2PO_4^- + OH^-}$$

at each of the phase points are tabulated in Table 3 below, in which the crystallization temperatures for phosphor salt and ammonium chloride are taken as 50° C. and 30° C. and also as 40° C. and 10° C., respectively.

Table 3

| | | Relative Ion Concentrations At Each Phase Point | | | | | | | |
|---|---|---|---|---|---|---|---|---|---|
| | phase point | a | b | c | d | e | f | g | h |
| | procedure | preparation of primary neutralized solution | addition of neutralized solution | addition of NaCl | addition of $NH_3$ | crystallization of phosphor salt | addition of $H_3PO_4$ | addition of NaCl | crystallization of $NH_4Cl$ |
| Crystallizations of phosphor salt and ammonium chloride at 50° C and 30° C, respectively | X* | 0.92 | 0.65 | 0.59 | 0.64 | 0.68 | 0.68 | 0.67 | 0.62 |
| | Y | 1.00 | 0.38 | 0.35 | 0.44 | 0.28 | 0.29 | 0.28 | 0.32 |
| | Z | 0.90 | 0.28 | 0.26 | 0.22 | 0.14 | 0.19 | 0.19 | 0.22 |
| Crystallizations of phosphor salt and ammonium chloride at 40° C and 10° C, respectively | X | 0.92 | 9.54 | 0.48 | 0.57 | 0.60 | 0.60 | 0.55 | 0.45 |
| | Y | 1.00 | 0.32 | 0.28 | 0.40 | 0.13 | 0.14 | 0.13 | 0.16 |
| | Z | 0.91 | 0.27 | 0.24 | 0.20 | 0.07 | 0.11 | 0.10 | 0.13 |

Note:

$$X = \frac{NH_4^+}{Na^+ + NH_4^+}$$

$$Y = \frac{H_2PO_4^- + OH^-}{Cl^- + H_2PO_4^- + OH^-}$$

$$Z = \frac{H_2PO_4^-}{Cl^- + H_2PO_4^- + OH^-}$$

As will be understood from the foregoing, the process of the invention is feasible by a substantially closed system, so that the phosphoric acid component contained in the wet process phosphoric acid solution can be recovered almost completely except those combined and entrained with the impurities such as Fe, Al, etc. In addition, the sodium component is also utilized at high efficiency in so far as it is not discharged from the system.

The present invention will be particularly illustrated by way of the following examples, in which percent is by weight.

EXAMPLE 1

A supernatant liquid of a circulating mother liquor from which ammonium chloride crystals has been removed by cooling it down to 10° C. had the following composition.

| $P_2O_5$ | $Na_2O$ | $NH_3$ | F | $F_e$ | Al | $SO_3$ | Cl |
|---|---|---|---|---|---|---|---|
| 5.06 | 9.72 | 4.33 | 0.12 | 0.02 | 0.02 | 2.06 | 16.85 |

While, a wet process phosphoric acid solution having a $P_2O_5$ concentration of 35% was added with sodium hydroxide to separate sodium silicofluoride as precipitate. The resulting filtrate had the following composition (%)

| $P_2O_5$ | $Na_2O$ | F | Fe | Al | $SO_3$ |
|---|---|---|---|---|---|
| 33.0 | 1.04 | 0.50 | 0.43 | 0.32 | 2.27 |

20.0 kg of the thus treated phosphoric acid solution was added with 1.0 kg of NaCl, to which ammonia gas was added until the pH of the solution reached 4.2. The solution was in a boiling state and impurities such as iron, aluminum, fluorine, etc., were settling. The precipitated impurities were removed by filtration to obtain an ammonium phosphate solution having the following formulation

| $P_2O_5$ | $Na_2O$ | $NH_3$ | F | Fe | Al | $SO_3$ | Cl |
|---|---|---|---|---|---|---|---|
| 30.13 | 3.86 | 7.37 | 0.11 | 0.02 | 0.02 | 2.10 | 3.11 |

To 4.90 kg of the phosphate solution was added 16.0 kg of the mother liquor from which ammonium chloride had been removed, to which 0.73 kg of industrial salt was further added. Then, ammonia gas was fed into the mixture for reaction until the pH of the mixture reached 8.0. Thereafter, the mixture was gradually cooled to 40° C. in an agitated reactor vessel.

The precipitated phosphor salt crystals were separated from the solution by a centrifugal separator and then washed with small amount of water to obtain 5.3 kg of crystals having the following formulation, together with 16.3 kg of a mother liquor containing no washing. The mother liquor obtained immediately after the separation had a relative ammonium ion concentration, $x$, of 0.59, a relative dihydrogenphosphate plus hydroxyl ion concentration, $y$, of 0.13, and a chlorine ion concentration of 0.26 mol/kg-water and corresponded to the phase point F of FIG. 1 at 40° C., with the following formulation (%)

|  | $P_2O_5$ | $Na_2O$ | $NH_3$ | F | Fe | Al | $SO_3$ | Cl |
|---|---|---|---|---|---|---|---|---|
| crystals | 33.9 | 14.9 | 8.11 | 0.004 | 0.001 | 0.001 | 0.02 | 0.02 |
| mother liquor | 3.05 | 8.19 | 6.63 | 0.16 | 0.03 | 0.03 | 3.00 | 20.1 |

To the mother liquor were added 1.0 kg of a fresh starting phosphoric acid solution and 0.49 kg of industrial salt, followed by cooling to 10° C. to permit ammonium chloride to precipitate. The precipitated crystals were separated by a centrifugal separator to obtain 1.2 kg of ammonium chloride and 16.9 kg of a mother liquor. The mother liquor had a pH of 5.8 and its supernatant liquid was found by analysis to have the following formulation (%)

| $P_2O_5$ | $Na_2O$ | $NH_3$ | F | Fe | Al | $SO_3$ | Cl |
|---|---|---|---|---|---|---|---|
| 5.05 | 9.70 | 4.32 | 0.14 | 0.02 | 0.02 | 2.50 | 16.81 |

In the above process, the phosphor salt was obtained at a yield of 94.7% based on the added Na component.

EXAMPLE 2

A circulating mother liquor from which ammonium chloride crystals had been removed was used with a supernatant liquid of the following formulation (%)

| $P_2O_5$ | $Na_2O$ | $NH_3$ | F | Fe | Al | $SO_3$ | Cl |
|---|---|---|---|---|---|---|---|
| 9.77 | 7.54 | 6.70 | 0.10 | 0.02 | 0.02 | 1.82 | 15.36 |

18.2 kg of the mother liquor was added with 3.13 kg of a phosphoric acid solution obtained by treating wet process phosphoric acid with sodium hydroxide in a manner similar to Example 1 and 0.79 kg of industrial salt, to which was further fed for reaction ammonia gas until the pH of the mixture reached 8.5. The reaction solution was then gradually cooled down to 50° C. while gently agitating. As a result, 4.2 kg of phosphor salt crystals and 17.8 kg of the separated mother liquor were obtained, respectively. The mother liquor had the following formulation (%)

| $P_2O_5$ | $Na_2O$ | $NH_3$ | F | Fe | Al | $SO_3$ | Al |
|---|---|---|---|---|---|---|---|
| 7.28 | 7.16 | 8.59 | 0.13 | 0.02 | 0.03 | 2.44 | 18.80 |

($x$ = 0.68, $y$ = 0.28, pH = 7.2)

This formulation was found to correspond to a point on the phase line F-H. To the mother liquor were then added 1.6 kg of the starting phosphoric acid as employed in Example 1 and 0.23 kg of industrial salt, followed by gradually cooling to 30° C. thereby obtaining 0.94 kg of ammonium chloride crystals and 19.0 kg of a mother liquor. The mother liquor was found to have the following supernatant liquid concentration (%) and a pH of 6.2.

| $P_2O_5$ | $Na_2O$ | $NH_3$ | F | Fe | Al | $SO_3$ | Cl |
|---|---|---|---|---|---|---|---|
| 9.76 | 7.52 | 6.67 | 0.12 | 0.02 | 0.03 | 2.50 | 15.32 |

The yield of the phosphor salt was found to be 96.1%.

EXAMPLE 3

A recycling mother liquor from which ammonium chloride crystals had been removed was used with a supernatant liquid of the following formulation

| $P_2O_5$ | $Na_2O$ | $NH_3$ | F | Fe | Al | $SO_3$ | Cl |
|---|---|---|---|---|---|---|---|
| 13.63 | 8.60 | 6.40 | 0.14 | 0.03 | 0.03 | 2.49 | 13.28 |

20.5 kg of the mother liquor was added with 6.43 kg of the phosphoric acid solution obtained by treating a wet process phosphoric acid with sodium hydroxide in a manner similar to Example 1 and 0.32 kg of industrial salt, to which was fed for reaction ammonia gas until the pH of the solution reached 8.5. The reaction solution was then gradually cooled to 50° C. in an agitated reactor vessel to obtain 8.1 kg of phosphor salt crystals and 18.9 kg of a mother liquor with the following formulation

| $P_2O_5$ | $Na_2O$ | $NH_3$ | F | Fe | Al | $SO_3$ | Cl |
|---|---|---|---|---|---|---|---|
| 10.58 | 5.20 | 10.15 | 0.20 | 0.04 | 0.04 | 3.75 | 16.49 |

($x = 0.78$, $y = 0.39$, pH = 8.2)

This formulation was found to correspond to the phase point H of FIG. 1. To the mother liquor were then added 2.7 kg of the starting salt and 1.56 kg of industrial salt, followed by gradually cooling to 30° C. to obtain 1.9 kg of ammonium chloride crystals and 21.5 kg of a mother liquor. The mother liquor separated had the following supernatant liquid formulation and a pH of 6.1.

| $P_2O_5$ | $Na_2O$ | $NH_3$ | F | Fe | Al | $SO_3$ | Cl |
|---|---|---|---|---|---|---|---|
| (%) | | | | | | | |
| 13.60 | 8.57 | 6.38 | 0.15 | 0.04 | 0.04 | 2.64 | 13.26 |

The phosphor salt was obtained at a yield of 95.5% based on the added Na component.

In the foregoing three Examples, the ammonium chloride crystals which had washed with water and then dried were found to have the following formulations

|  | $NH_3$ | $Na_2O$ | $P_2O_5$ | Cl |
|---|---|---|---|---|
| Example 1 | 30.9% | 0.03% | 0.10% | 64.5% |
| Example 2 | 31.2 | 0.04 | 0.12 | 65.0 |
| Example 3 | 31.4 | 0.04 | 0.15 | 65.3 |

What is claimed is:

1. A process for producing sodium ammonium hydrogen-phosphate and ammonium chloride from wet process phosphoric acid, the process comprising the steps of:
   (a) introducing ammonia into a wet process phosphoric acid solution until the pH of said solution ranges from 3.5 to 6.0 to cause precipitation of impurities contained in said solution, said solution being maintained at a temperature above 60° C. upon completion of the introduction of ammonia;
   (b) separating at least a portion of the precipitated impurities from said solution, the resulting solution having a molar ratio of $NH_3/H_3PO_4$ of from 0.7 to 1.5;
   (c) adding the solution from which said impurities have been separated, to a circulating mother liquor maintained at temperatures within which sodium ammonium hydrogenphosphate is hard to precipitate;
   (d) introducing sodium chloride into the solution in step (a) or into the mother liquor in step (c);
   (e) additionally introducing ammonia into the liquor until the pH of said liquor ranges from 5.5 to 9.0, the total amounts of ammonia introduced in steps (a) and (e) and of sodium chloride introduced in step (d) being such that the molar ratios of $H_3PO_4$:$NH_3$:NaCl are in the range of 1:1.6–2.5:0-.2–2.8;
   (f) cooling of the liquor to a temperature of 30° C. to 60° C. to permit sodium ammonium hydrogenphosphate to separate as crystals;
   (g) removing said crystals from the liquor;
   (h) adding to the liquor from which said crystals have been removed, an acidic compound selected from the group consisting of phosphoric acid, acidic ammonium phosphate, hydrochloric acid, sulfuric acid, nitric acid and a mixture thereof, thereby adjusting the pH of the liquor to 5.6–6.4;
   (i) cooling the resulting liquor to a temperature which is lower than the temperature of step (f) and which ranges from 5° C. to 50° C. to precipitate ammonium chloride as crystals;
   (j) removing the ammonium chloride crystals from the liquor; and
   (k) recycling the resulting solution for use as a circulating mother liquor.

2. A process as claimed in claim 1, wherein, in step (e), the pH of said liquor is in the range of from 7.1 to 8.5 and the molar ratio of $H_3PO_4$:$NH_3$:NaCl are in the range of 1:1.6–2.5:0.7–1.2.

3. A process as claimed in claim 1, wherein, in step (e), the pH of said liquor is in the range of 6.2 to 8.0 and the molar ratios of $H_3PO_4$:$NH_3$:NaCl are in the range of 1:1.6–2.5:1.3–2.8.

4. A process as claimed in claim 1, wherein the temperature of step (c) is in the range of about 60° C.

5. A process as claimed in claim 1, wherein the pH of said liquor in step (e) is in the range of from 6.2 to 9.0.

6. A process as claimed in claim 1, wherein the temperature of step (f) is in the range of from 40° C. to 50° C., while the temperature of step (i) is in the range of from 10° C. to 30° C.

7. A process as claimed in claim 1, wherein the pH of the liquor in step (h) is adjusted to 5.83 and the crystallization is conducted at 10° C. in the subsequent step (i).

8. A process as claimed in claim 1, wherein the pH of the liquor in step (h) is adjusted to 5.95 and the crystallization is conducted at 20° C. in the subsequent step (i).

9. A process as claimed in claim 1, wherein said acidic compound is phosphoric acid.

10. A process as claimed in claim 1, wherein said acidic compound is acidic ammonium phosphate.

11. A process as claimed in claim 1, wherein said sodium chloride is an industrial salt.

12. A process as claimed in claim 1, further comprising adding sodium chloride to the liquor at or subsequent to the step (h).

* * * * *